(12) United States Patent
Wang et al.

(10) Patent No.: US 9,462,515 B2
(45) Date of Patent: Oct. 4, 2016

(54) WIRELESS COMMUNICATION SYSTEM UTILIZING ENHANCED AIR-INTERFACE

(71) Applicant: Broadcom Corporation, Irvine, CA (US)

(72) Inventors: Shao-Cheng Wang, Santa Clara, CA (US); Pavan Nuggehalli, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 10 days.

(21) Appl. No.: 14/157,112

(22) Filed: Jan. 16, 2014

(65) Prior Publication Data

US 2014/0199996 A1    Jul. 17, 2014

Related U.S. Application Data

(60) Provisional application No. 61/753,749, filed on Jan. 17, 2013.

(51) Int. Cl.
H04W 4/00 (2009.01)
H04W 36/00 (2009.01)
(Continued)

(52) U.S. Cl.
CPC ......... *H04W 36/0066* (2013.01); *H04W 36/14* (2013.01); *H04W 48/16* (2013.01)

(58) Field of Classification Search
CPC .................... H04W 28/0226; H04M 15/8038
USPC .............. 455/426.1, 436, 437, 439; 370/331
See application file for complete search history.

(56) References Cited

U.S. PATENT DOCUMENTS

2004/0090935 A1    5/2004  Courtney
2008/0268844 A1*  10/2008  Ma et al. .................. 455/436
(Continued)

FOREIGN PATENT DOCUMENTS

EP    1058473 A1    12/2000
EP    2222107 A1    8/2010
(Continued)

OTHER PUBLICATIONS

IEEE 802.11u-2011, IEEE Standard for Information Technology—Telecommunications and information exchange between systems—Local and Metropolitan networks-specific requirements—Part 11, Wireless LAN Medium Access Control (MAC) and Physical Layer (PHY) specifications: Amendment 9: Interworking, with External Networks, dated Feb. 25, 2011; 190 pages.
(Continued)

*Primary Examiner* — Thomas Lett
(74) *Attorney, Agent, or Firm* — Sterne, Kessler, Goldstein & Fox PLLC

(57) ABSTRACT

In a Long Term Evolution (LTE) environment, the LTE network can coordinate with a subscribing user equipment to manage offloading to a wireless local area network (WLAN) access point or other base station. In doing so, the serving base station on the LTE network can acquire device capabilities of the user equipment and provide configuration details to the user equipment based on those capabilities. These configuration details may cause the user equipment to monitor one or more triggers, and may configure a scan to be later performed by the user equipment. Based on the monitored trigger, the user equipment can then scan the environment according to the scan configuration defined by the base station, and relay scan results to the base station to make a handover determination.

20 Claims, 9 Drawing Sheets

(51) Int. Cl.
*H04W 36/14* (2009.01)
*H04W 48/16* (2009.01)

(56) References Cited

U.S. PATENT DOCUMENTS

| | | | |
|---|---|---|---|
| 2010/0003980 A1 | 1/2010 | Rune et al. | |
| 2012/0324100 A1 | 12/2012 | Tomici et al. | |
| 2013/0094472 A1* | 4/2013 | Klingenbrunn et al. | 370/331 |
| 2013/0260736 A1* | 10/2013 | Amerga et al. | 455/418 |
| 2014/0200008 A1 | 7/2014 | Wang et al. | |

FOREIGN PATENT DOCUMENTS

| | | |
|---|---|---|
| GB | 2489553 A | 10/2012 |
| WO | WO 2011/094933 A1 | 8/2011 |

OTHER PUBLICATIONS

IEEE 802.11-2012, IEEE Standard for Information technology—Telecommunications and informatin exchange between systems Local and metropolitan area networks—Specific requirements Part 11: Wireless LAN Medium Access Control (MAC) and Physical Layer (PHY) Specifications; 2793 pages.

3rd Generation Partnership Project; Technical Specification Group Radio Access Network; Evolved Universal Terrestrial Radio Access (E-UTRA); Radio Resource Control (RRC); Protocol specifications (Release 12.0.0), dated Dec. 2013; 349 pages.

3rd Generation Partnership Project; Technical Specification Universal Mobile Telecommunications System (UMTS); LTE; 3GPP system to Wireless Local Area Network (WLAN) interworking; System description (3GPP TS 23.234 version 11.0.0 Release 11), dated Sep. 2012; 86 pages.

3rd Generation Partnership Project; Technical Specification Universal Mobile Telecommunications System (UMTS); LTE; Non-Access-Stratum (NAS) protocol for Evolved Packet System (EPS); Stage 3 (3GPP TS 23.301 version 11.9.0 Release 11), dated Jan. 2014; 334 pages.

3rd Generation Partnership Project; Technical Specification LTE; Evolved Universal Terrestrial Radio Access (E-UTRA); LTE Positioning Protocol (LPP) (3GPP TS 36.355 version 11.5.0 Release 11), dated Jan. 2014; 120 pages.

European Search Report directed to related European Patent Application No. 14000176.9, mailed May 19, 2014; 7 pages.

European Search Report directed to related European Patent Application No. 14000177.7, mailed Aug. 18, 2014; 3 pages.

European Search Report directed to related European Patent Application No. 14000177.7, mailed Aug. 26, 2014; 8 pages.

\* cited by examiner

WIRELESS COMMUNICATION SYSTEM UTILIZING ENHANCED AIR-INTERFACE

CROSS-REFERENCED TO RELATED APPLICATIONS

This patent application claims the benefit of U.S. Provisional Patent Application No. 61/753,749, filed Jan. 17, 2013, entitled "Wireless Communication System Utilizing Enhanced Air-Interface," which is incorporated herein by reference in its entirety.

BACKGROUND

1. Technical Field

This disclosure relates to offloading communications traffic from a base station, for example, to one or more WLAN access points within a communications environment.

2. Related Art

Wireless communication devices, such as cellular telephones to provide an example, have become commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, the wireless communication device will continuously detect and measure connection characteristics in order to make a determination as to whether it should remain connected to a current base station, or switch to a different base station. Also, when a determination has been made to offload, conventional wireless communication systems use unicast signaling to communicate offload triggers and configurations between a User Equipment (UE) and a network.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
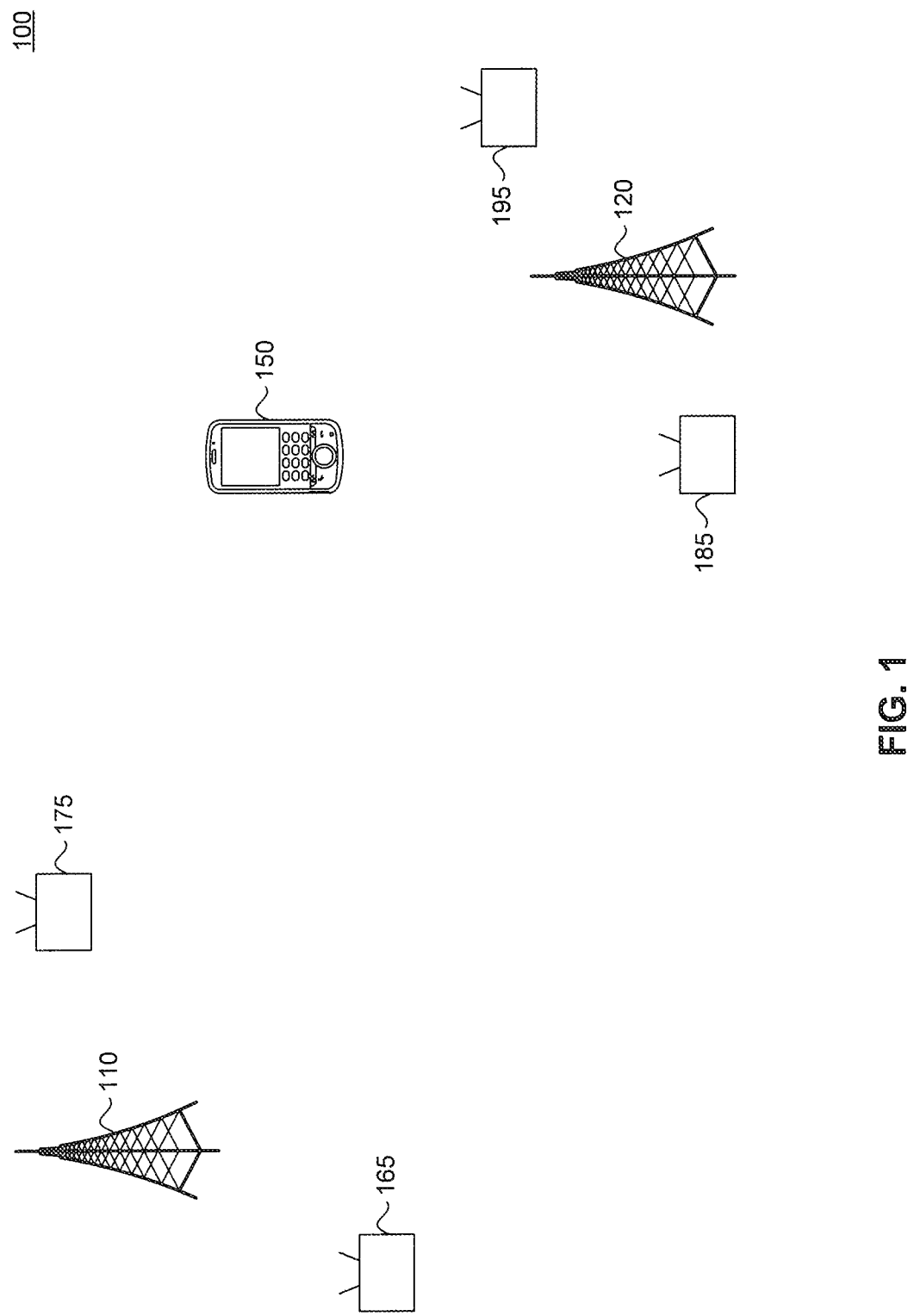
FIG. 1 illustrates a diagram of an exemplary wireless communication environment.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" and the like, shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Terms like "user equipment," "mobile station," "mobile," "mobile device," "subscriber station," "subscriber equipment," "access terminal," "terminal." "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B." "evolved Node B (eNode B)," home Node B (HNB)," "home access point (NAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations.

Although several portions of the description of the present disclosure may be described in terms of wireless devices (specifically cellular devices), those skilled in the relevant art(s) will recognize that the present disclosure may be applicable to any other devices without departing from the spirit and scope of the present disclosure.

An Exemplary Wireless Communication Environment

FIG. 1 illustrates an exemplary wireless communication environment 100. In the environment 100, there may be included one or more base stations, such as base stations 110 and 120. Although the base stations may be termed differently in the art depending on their corresponding radio access technology (e.g., eNodeB for 4G, etc.), for purposes of this disclosure they will collectively be referred to as "base stations." In addition to the base stations, the environment 100 may also include one or more WLAN access points, such as access points 165, 175, 185 and 195.

In the environment 100, a user equipment (UE) 150 connects to one of the base stations (e.g., base station 120). As discussed above, conventionally, while the UE 150 is connected to the base station 120, the UE will continuously measure connection characteristics of the serving base station 120, as well as other nearby base stations (e.g., base station 110). From the characteristics, the UE 150 can make determinations as to whether to offload from the serving base station 120 to the nearby base station 110.

Today's wireless communication devices (e.g., UEs) have the ability to access the internet, stream video and music, and other such activities that can cause significant congestion in mobile cellular networks. Therefore, inter-system offloading has been devised as a potential solution, which causes the UE to offload from a serving base station to a different radio access technology (RAT), such as WLAN (e.g., via a WLAN access point). This can not only assist with alleviating cell congestion, but can also provide the user with better quality of service and user experience. WLAN may also be known as WiFi, and therefore WiFi and WLAN are interchangeable herein. In an embodiment, WiFi can be any WLAN compatible with one or more the IEEE 802.11 suite of standards.

Conventional offloading solutions, such as 3GPP I-WLAN architecture (See 3GPP TS 23.234 specification, incorporated herein by reference in its entirety), relies on policies stored in the UE with pre-configured conditions to trigger offloading and controlled by Access Network Discovery and Selection Function (ANDSF). The ANDSF framework uses these policies to assist user devices to discover access networks in their vicinity and prioritize/manage connections to all networks. These policies are either statically pre-configured on the UE or dynamically updated by the ANDSF network element to the UE via Open Mobile Alliance Device Management protocol, i.e. OMA DM protocol.

When a certain policy becomes "active", e.g. the UE moves close to a cell that is specified in the policy validity condition, the UE notifies the event to the ANDSF server and requests the Inter-system discovery information based on the preferred access technology recommended in the policy, e.g. WLAN. The ANDSF server will provide the UE with Wi-Fi Hotspot service set identifier (e.g. access point SSIDs) in the vicinity and related Wi-Fi access information such as security keys. The UE uses these assistance data to connect to the Wi-Fi network.

There are a several drawbacks with this approach. For example, the ANDSF framework stores the policies in the UE and relies on OMA DM protocol to update policies. Since the OMA DM protocol is slow, it is not responsive enough to support network-based interworking trigger events, such as offload due to sudden overload on Long Term Evolution (LTE) eNodeBs. Also, the types of triggers or validity conditions are limited. Only location, time-of-day, or types of application are available in 3GPP Rel-11 specification. Further, the information provided to the UE for Wi-Fi discovery and selection is also very limited. Further still, this configuration lacks the capability for the UE to provide up-to-date radio resource information at the offload side to the cellular network.

Therefore, in an embodiment, the UE can communicate its capabilities to the base station. Based on these capabilities, the base station can define and notify the UE of triggering conditions that will cause the UE to scan. During operation, the UE can then be configured to provide certain status updates to the base station, which the base station can factor into its offload decision-making. Based on the defined triggering conditions, the UE can scan the environment and report back to the base station for cooperatively determining whether to handoff. This approach will be discussed in more detail throughout the present specification.

Figure 2:
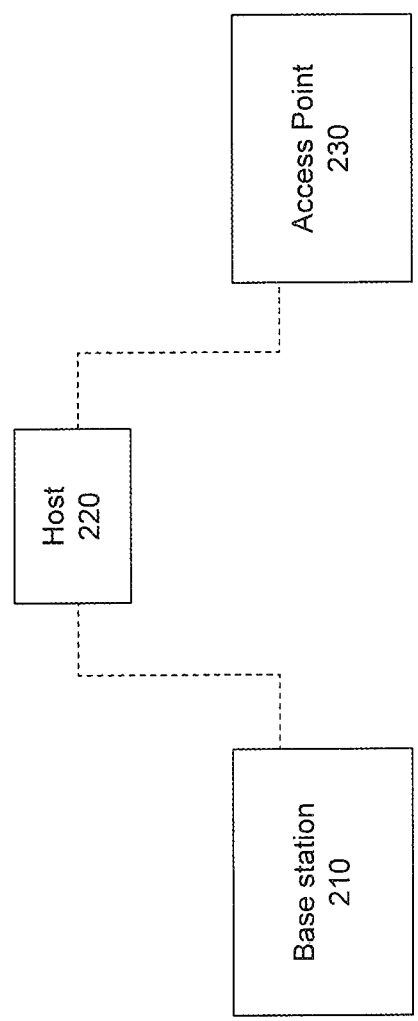
FIG. 2 illustrates a block diagram of an exemplary base station and access point within an exemplary wireless communication environment.

FIG. 2 illustrates a block diagram of an exemplary base station 210 and WLAN access point 230. In an embodiment, the base station 210 and the WLAN access point 230 can be connected by a host 220. The host 220 can perform coordinated control of the base station 210 and the WLAN access point 230, and/or represent a communication link between the base station 210 and the access point 230. In this configuration, the base station 210 can acquire information from the access point 230 to assist with the offloading decision-making and/or scanning instruction provided to the UE.

Exemplary Base Station and User Equipment

Figure 3:
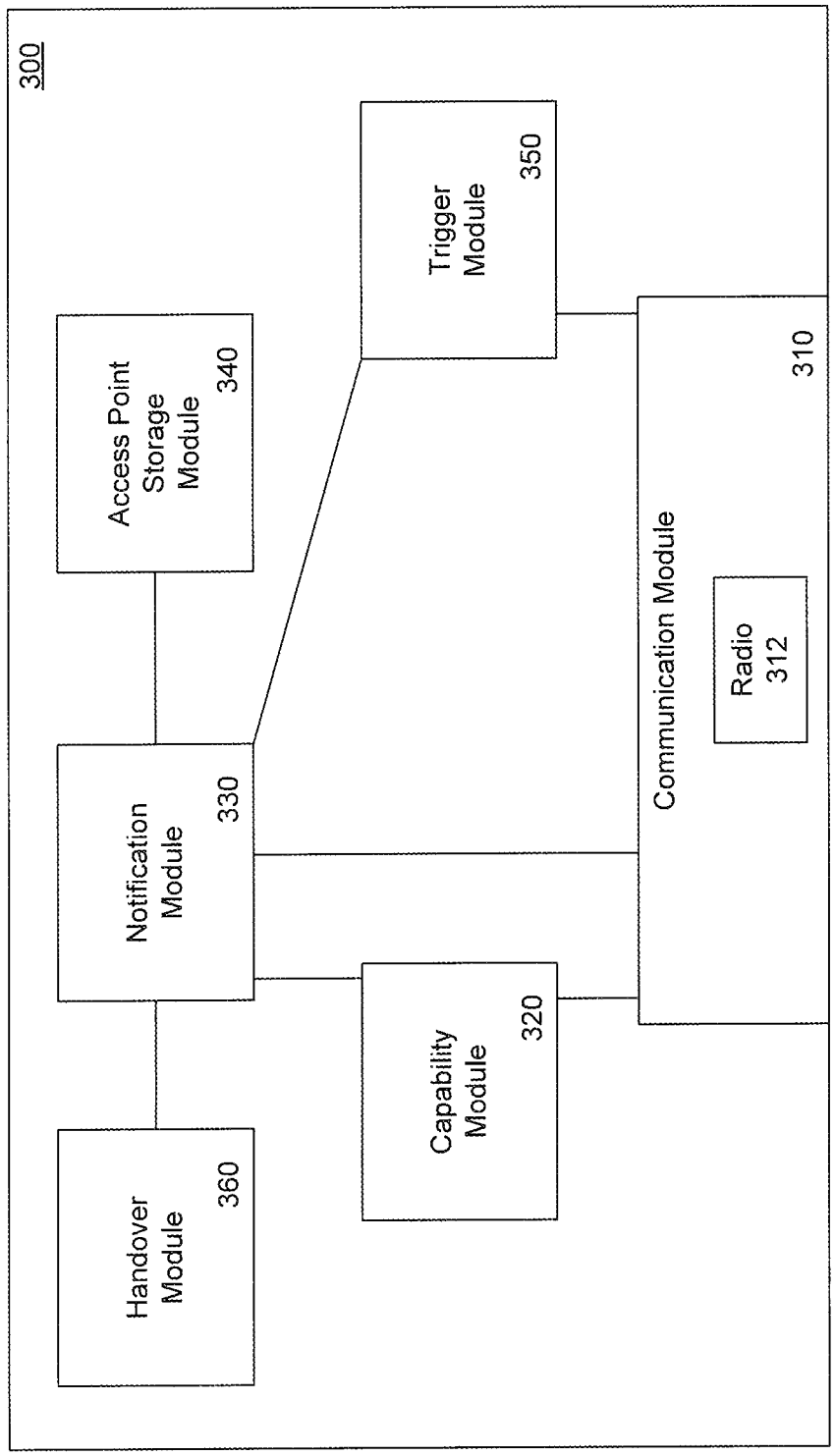
FIG. 3 illustrates a block diagram of an exemplary base station.

FIG. 3 illustrates a block diagram of an exemplary base station 300. The base station 300 includes a communication module 310, a capability module 320, a notification module 330, an access point storage module 340, and a trigger module 350, all or some of which can be executed utilizing one or more processors or circuits. For example, all or some of the modules of base station 300 can be implemented using one or more processor(s) and/or state machine logic and/or circuits, or a combination thereof, programmed or implemented to have the functionality described herein. Although separate modules are illustrated in FIG. 3, the disclosure is not so limited, as will be understood by those skilled in the arts. The modules can be combined in one or more modules, and can be implemented by software, hardware, or a combination thereof. The base station 300 may represent an exemplary embodiment of the base station 110 within the wireless communication environment 100.

The communication module 310 includes a radio 312 that is configured to communicate with UEs, base stations, and/or access points in the environment 100. The communication module 310 acquires data from the other devices in the environment 100 for use in the offloading determination and configuration, and can issue offloading triggers and/or commands to UEs in the environment 100, as will be discussed in further detail below.

Figure 4:
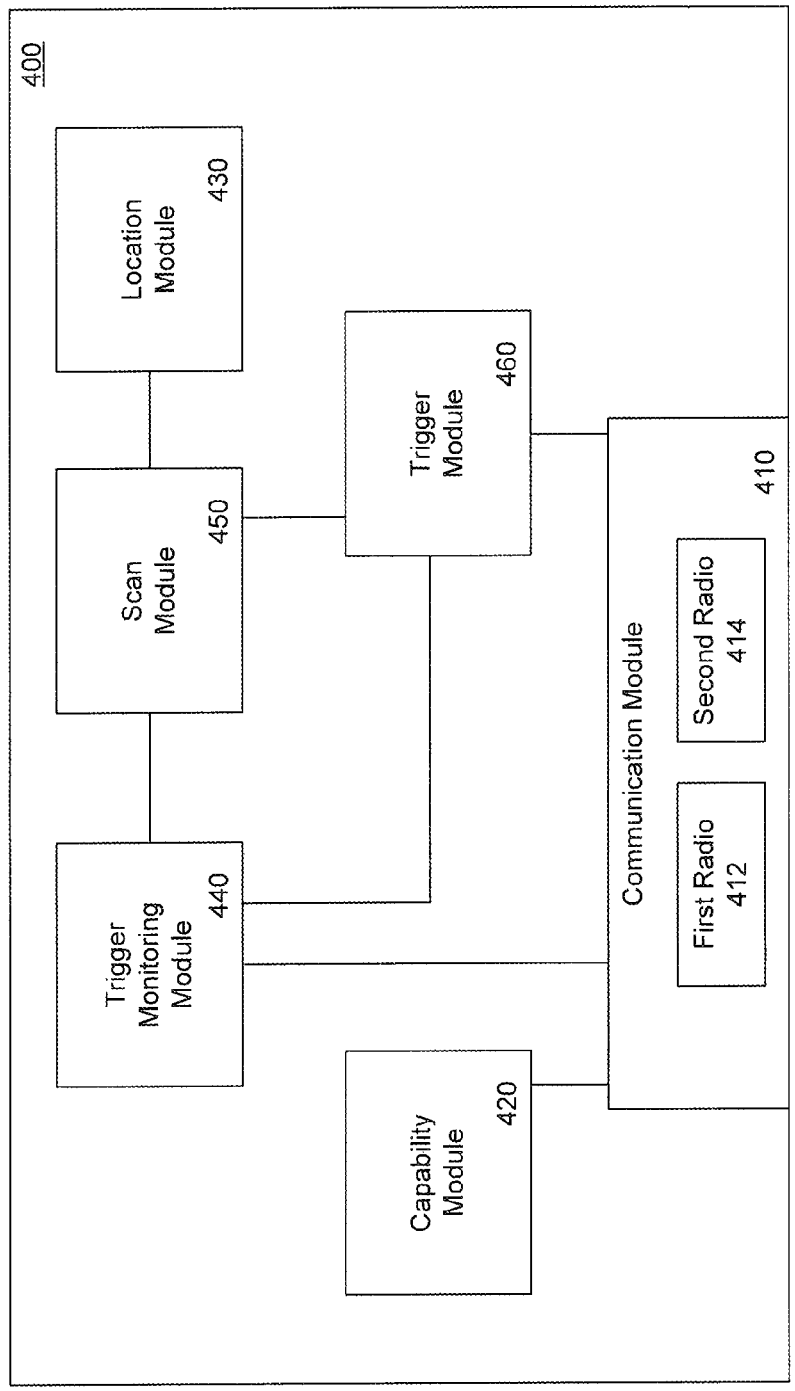
FIG. 4 illustrates a block diagram of an exemplary user equipment.

FIG. 4 illustrates a block diagram of an exemplary user equipment (UE) (e.g., wireless communication device) 400 according to an embodiment. The UE 400 includes a communication module 410, a capability module 420, a location module 430, a trigger monitoring module 440, a scan module 450, and a trigger module 460, all of which can be executed utilizing one or more processors. For example, all or some of the modules of UE 400 can be implemented using one or more processor(s) and/or state machine logic and/or circuits, or a combination thereof, programmed or implemented to have the functionality described herein. Although separate modules are illustrated in FIG. 4, the disclosure is not so limited, as will be understood by those skilled in the arts. The modules can be combined in one or more modules, and can be implemented by software, hardware, or a combination thereof. The UE 400 may represent an exemplary embodiment of the UE 150 within the wireless communication environment 100.

Offloading Coordination

While the UE 400 is being served by the base station 300, the base station can coordinate with the UE 400 in order to configure various offloading procedures for streamlining future offloading from the base station 300 to a WLAN or other access point. In an embodiment, the base station 300 operates according to a first RAT, e.g. a cellular carrier standard, such as LTE, 4G, 3G, among others. Accordingly, the communication module 410 includes a first radio 412 having a transmitter and receiver for effecting the cellular communications with the base station 300. Further, the communication module 410 includes a second radio 414 having a transmitter and receiver for effecting communications with the offload technology that is a different RAT from the cellular RAT, e.g. WLAN.

WLAN Interworking Exchange

At the outset, in order to configure the offloading, the base station 300 should first acquire the various capabilities of the UE 400 as they relate to offloading. Therefore, the capability module 320 of the base station 300 transmits a WLAN interworking capability inquiry message to the UE 400 via the radio 312 of the communication module 310. The WLAN interworking capability inquiry message requests the UE 400 to respond with its WLAN and other communication abilities, as well as whether other pertinent offloading capabilities, as will be discussed herein. A UECapabilityEnquiry message, which is defined as part of the "UE capability transfer" procedure of the LTE standard, is modified according to embodiments herein to include the WLAN interworking capability inquiry message. Herein, standards related messages, including existing, modified or new per the disclosure herein, are italicized, for ease of understanding.

The UE 400 receives this message via its own radio 412 included in its communication module 410 and forwards the message to the capability module 420. The capability module 420 is responsible for assessing the current capabilities of the UE 400 and providing a response to the WLAN interworking capability inquiry message that includes the requested capabilities. In an embodiment, the capabilities can be programmed during manufacturing and are known by the capability module 420. In another embodiment, the capability module 420 can perform a diagnostic periodically or at the time of receiving the WLAN interworking capability inquiry message in order to determine whether one or more of its original capabilities are in working order so as to provide a more accurate response to the base station 300. The capabilities can include an indication of the one or more versions of the IEEE 802.11x standards that the UE is compatible with, including IEEE 802.11a, 802.11b, 802.11g, 802.11n, etc.

After the capability module 420 has determined the available capabilities of the UE 400, the capability module 420 responds to the base station 300 with a WLAN interworking capability information message. This message will preferably include an indication regarding whether the UE 400 is capable of performing WLAN interworking mobility procedures. For purposes of this discussion, WLAN interworking mobility procedures include the ability to receive commands from the cellular network (such as LTE, for example) to be applied to a connection between the UE and WLAN or another divergent network and/or access point. The WLAN interworking capability information message can include additional information that may be pertinent to the offloading procedure, or as requested by the base station 300, such as for example the WLAN radio capability (e.g., WLAN frequency bands, data rates, etc.) of the UE 400.

In addition to the interworking and WLAN radio capabilities, the capability module 420 may also include relevant device restrictions that should be accounted for by the base station 300. For example, the capability module 420 can include an indication as to whether the UE requires measurement gaps to perform scanning. For purposes of this discussion, a measurement gap is a period downlink silence, during which the UE 400 can perform a radio scan of its environment. In other words, the measurement gap is a period of time provided to the UE 400 by the base station 300 during which the base station 300 will refrain from transmitting data to the UE 400. In addition to the measurement gap information, the capability module 420 may also prompt the trigger module 460 for proposed triggers, and may then include any such proposed triggers in the WLAN interworking capability information message. The proposing of the triggers will be discussed in further detail below.

To summarize, in response to the WLAN interworking capability inquiry message received from the base station 300, the capability module can respond with a WLAN interworking capability information message that includes: (1) whether WLAN interworking supported or not supported; (2) whether WLAN measurement gap needed or not needed; (3) (Optionally) the WLAN radio capabilities including IEEE 802.11 compatible standards; and (4) (Optionally) Proposed WLAN interworking notification trigger conditions. Additional information can be included in the response message that may be pertinent or requested, within the spirit and scope of the present disclosure.

In an embodiment, the base station 300 might need to forward the WLAN interworking capabilities (or other information) of the UE 400 to other entities in the core network. One possible solution is for the base station 300 to share this information with a network backhaul, such as a Mobility Management Entity (MME), for providing to other base stations in the environment 100. In addition, the base station 300 can also share this information directly with other eNodeBs. Alternatively, the MME can acquire the WLAN interworking capabilities using dedicated signaling, such as NAS signaling (See 3GPP TS 24.301 specification, incorporated herein by reference in its entirety). The MME can then distribute the acquired information to the relevant base stations, such as base station 300. This procedure may include a determination by the MME as to whether the base station 300 should be aware of the acquired information, or a request to the MME by the base station 300. In an embodiment, the MME may also make a determination as to whether there is a "mismatch" in order to prevent forwarding the WLAN interworking capabilities to a base station that is not capable of WLAN interworking procedures.

WLAN Interworking Notification and Configuration

Once the base station 300 has received the capability information from the user equipment 400, the base station 300 can then proceed to configure the notification procedure that will be carried out by the base station 300 and the user equipment 400. The notification procedure defines how the user equipment 400 or the base station 300 can trigger interworking assistance for scanning and/or offloading the user equipment 400 to a WLAN or other access point (AP).

As discussed above, in an embodiment, the trigger module 460 of the user equipment may respond to the WLAN interworking capability inquiry message with one or more proposed triggers. These triggers may be parameters that the user equipment 400 is capable of monitoring and/or detecting, and which could be relevant to deciding whether to offload to a WLAN AP. For example, such proposed triggers may include remaining battery life, application type, LTE signal strength, among others. The use of these triggers by the UE will be discussed in further detail below.

The proposed triggers are received by the base station 300 as part of the received WLAN interworking capability information message and are sent to the trigger module 350. The trigger module 350 makes a determination as to whether to accept or reject each of the proposed triggers, and can also mandate new triggers that were not proposed. These determinations can be made based on the analysis capabilities of the base station 300, or preprogrammed or trigger preferences. The trigger module 350 can also consult with other eNodeBs and/or other network backhaul entities, e.g. MME, for these determinations. The trigger module 350 also has the option of modifying the proposed trigger conditions, such as by their thresholds or other parameters.

Once the trigger module 350 has made its determinations as to the trigger conditions that should be employed by the UE 400, the trigger module 350 causes the notification module 330 to transmit a WLAN Interworking notification configuration message to the UE 400. The WLAN Interworking notification configuration message includes an indication of whether each of the proposed triggers were accepted, rejected, or modified, as well as a detailed listing of the additional trigger conditions that should be monitored by the UE 400. In order to compare WLAN Interworking capability message and the WLAN Interworking notification configuration message regarding the exchange of triggers, Table 1 below, provides some examples of trigger conditions included within the different messages:

TABLE 1

Example Content of Trigger Conditions in WLAN Messages

| | Use case | |
|---|---|---|
| | WLAN interworking capability message (UE->BS) | WLAN Interworking notification configuration message (BS->UE) |
| Manual notification | "cause codes" for manual triggers | Allow/not allow, allowed "cause codes" for manual triggers |
| Battery level | Battery threshold (%) to trigger WLAN interworking notification | Allow/not allow, battery threshold (%) setting if allow |
| Type of application | TCP/IP port number | Allow/not allow, TCP/IP port number if allow |
| . . . | | |

In addition to the triggers, the notification module 330 can also include within the WLAN Interworking notification configuration message an indication regarding whether UE notification and WLAN interworking notification will be employed for the UE 400. For purposes of this discussion, it will be understood that "UE notification" is the process of the UE 400 automatically detecting whether the triggers have been met, performing a environment scan (measurement) upon the satisfaction of one of the triggers, and providing a measurement report to the base station 300 for determining whether to offload. Herein, scan refers to frequency tuning the radio 414 in UE 400 to detect potential WLAN access points for offload, including measuring signal strengths at corresponding frequencies of the access points for inclusion in the measurement report. It will also be understood that the "WLAN interworking notification" is the process of the UE 400 detecting whether a trigger has been satisfied, and notifying the base station in this regard. In response, the base station 300 can then command the UE 400 as to whether and what to scan and measure. Further, the base station 300 can also provide the UE 400 with a prohibit timer that defines the minimum amount of time that must elapse between notification or measurement messages from the UE 400 to the base station 300.

The signaling procedure between the base station 300 and the UE 400 for performing environment measurement scans will thus depend on which of the above features have been enabled by the base station.

In a first scenario, the base station 300 indicates in the WLAN Notification Configuration message that both WLAN interworking notification and UE notification are allowed.

In this scenario, the UE 400 receives the WLAN Notification Configuration message and configures its trigger monitoring module 440 to monitor the triggers defined in the message. As part of the WLAN interworking notification, when the trigger monitoring module 440 detects that one of the defined triggers has been met, the trigger monitoring module 440 can cause a WLAN Interworking Notification message to be sent to the base station 300 that includes a notification of the trigger that has been satisfied. Optionally, the WLAN Interworking Notification message can also include the location of the UE 400 from the location module 430, and/or its accuracy. The location information can be used by the base station when configuring the scan parameters of the UE 400, as discussed in further detail below.

In a second scenario, the base station 300 indicates in the WLAN Notification Configuration message that WLAN interworking notification is not allowed, but that UE notification is allowed.

In this scenario, because WLAN Notification Configuration is not allowed, the UE 400 does not notify the base station 300 when a trigger has been satisfied. However, because UE Notification is still allowed, the UE 400 can perform scans of the environment (in accordance with scan parameters set forth by the base station 300, discussed below), and report the scan results to the base station 300.

In a third scenario, the base station 300 indicates in the WLAN Notification Configuration message that neither WLAN interworking notification or UE notification is allowed. In an embodiment, the base station can signal this scenario to the UE 400 by rejecting all proposed triggers and by not providing any new triggers.

Regardless of the scenario chosen, the base station 300 may at any time reconfigure the UE 400 by transmitting an updated WLAN Interworking Notification Configuration message. In an embodiment, the UE 400 is configured to always follow the latest configuration from the base station 300.

To summarize the above discussion, the WLAN Interworking Notification Configuration message sent by the base station 300 to the UE 400 can include: (1) UE notification allowed/disallowed; (2) (Optionally) triggers; (3) (Optionally) prohibit timer; and (Optionally) WLAN channels and AP white/blacklist (discussed below). Similarly, the WLAN Internetworking Notification message sent by the UE 400 to the base station 300 can include: (1) an interworking assistance request; (2) (Optionally) UE location information and estimated accuracy; and (Optionally) preferred technology (e.g., WLAN, WiMAX, etc.) and preferred network provider.

WLAN Measurement Configuration

Once the scanning and triggering parameters have been configured between the base station 300 and the UE 400, the notification module 330 of the base station 300 can transmit a WLAN Measurement Configuration message to configure the scanning parameters that the UE 400 will use when performing scans of the environment 100. The parameters can include the WLAN channels that the UE 400 should scan, the triggers that will cause the scan, among others. The scan is intended to gather knowledge of radio resources at the offload side. The base station 300 can then use these resources to minimize offload latency by coordinate inter-system mobility.

In an embodiment, the notification module 330 can generate and forward the WLAN Measurement Configuration message anytime after receiving the WLAN Interworking Capability Information message from the UE 400. In other embodiments, depending on the abilities of the UE 400, the notification module 330 can transmit the WLAN Measurement Configuration message after receiving the WLAN Interworking Notification message (scenario 1), or after one or more triggers are detected by the base station 300 (scenarios 2 and 3).

In one example, the base station 300 can seek a one-time snapshot of the WLAN APs within the vicinity of the UE 400. This may occur when the network is facing some congestion on air interface capacity or if the UE 400 notifies the base station 300 that it needs immediate offload assistance. Based on the approximate knowledge of the location of the UE 400, the notification module 330 can select the WLAN channels that are likely to have interworking capable WLAN APs in the vicinity of the UE 400. The notification module 330 can acquire this information from the access point storage module 340, which may store location, frequency channels, security information, interworking capabilities, owner/operator, and/or other information of the various access points that have been detected or reported in the environment 100. In the above example, the notification module 330 provides the WLAN measurement configuration message to the UE 400 notifying it of WLAN APs within its vicinity to scan. In an embodiment, the notification module 330 can notify the UE 400 to scan all WLAN channels in its vicinity. This can occur when the access point storage module 340 does not include any information of APs within the vicinity of the UE 400, or the notification module 330 does not know the location of the UE 400.

In another embodiment, the notification module 330 can include one or more scan triggers in the WLAN Measurement Configuration message, which will cause the UE 400 to perform the scan only upon the satisfaction of one or multiple of the triggers. If the message includes both the triggers and the WLAN channels, the UE will be configured to scan only the identified channels and only upon the satisfaction of the triggers. An example of a scan trigger may be the signal strength of the serving base station. Such a trigger is useful when the offload decision is triggered because of coverage, i.e. network would like to offload/handover UE to WLAN when LTE signal strength is weak at the current UE location, for example weaker than a predetermined threshold. The signal strength trigger threshold can also be a combination of LTE serving cell, LTE neighboring cells, and WLAN neighbor APs, among others. Herein, the triggers in the TI/LAN Measurement Configuration message can be referred to as report triggers, as they can cause a report to be generated by the UE.

In another embodiment, the notification module 330 can include a scan periodicity and/or a maximum report amount in the WLAN Measurement Configuration message. The scan periodicity defines the intervals with which the UE 400 will repeatedly perform the scanning operation. This configuration may be beneficial if the network detects the UE 400 is in a medium mobility state and the UE may require WLAN offload/handover soon. As with the above, the scan periodicity can be included with one or both of the WLAN channels and the triggers for a combined configuration. The maximum report amount, on the other hand, identifies a maximum number of APs that the UE 400 should report back from its scan.

In any scenario, the notification module 330 can limit its listing of access points to those that it doesn't expect to be subject to LTE/WLAN interference. In addition, the notification module 330 can also configure measurement gaps for the UE 400 based on whether the UE indicated in the WLAN Interworking Capability message that it requires measurement gaps.

In an embodiment, the notification module 330 can also include in the WLAN Measurement Configuration message an AP whitelist or blacklist in the form of WLAN SSIDs. The whitelist identifies APs that the UE 400 should precede to report, whereas the blacklist identifies APs that the UE should not report. In an embodiment, the whitelist can identify only the APs that are owned by (or associated with) the operator/owner of the base station 300. Similarly, the blacklist can identify the APs that are not owned by (or associated with) the operator/owner of the base station 300.

In an embodiment, the notification module 330 can also include in the WLAN Measurement Configuration message a request for the UE to provide location information of itself and/or the measured APs in its response to the message.

To summarize the above, the base station provides the following content in the WLAN measurement configuration message: (1) the WLAN channels to scan; (2) report trigger: one-shot, threshold-based, or periodic; (3) (Optionally)

report periodicity and maximum report quantity; (4) (Optionally) the SSID whitelist (and corresponding "SSID label") and/or blacklist; and (5) (Optionally) location information request in measurement reports (See e.g., "WLAN Measurements for SON Purpose," below).

Once the base station 300 has generated and transmitted the WLAN measurement configuration message to the UE 400, the UE 400 receives the message at its scan module 450. Using the parameters contained within the message, the UE 400 configures the scan module 450 accordingly. At the prescribed time, the scan module 450 scans the environment in accordance with its configuration and stores information relating to the detected WLAN access points.

To provide an example, if the scan is to be performed upon a trigger, the trigger monitoring module 440 notifies the scan module 450 when the trigger has been satisfied. This causes the scan module 450 to tune the radio 414 for WLAN to scan the environment at the channels/frequencies identified by the base station 300. The scanning can measure signal strengths at various frequencies and other information indicated below in the measurement report. For example, SSIDs and data load can be determined from beacons transmitted by the various APs. In an embodiment, the scan module 450 is capable of scanning both APs with broadcast SSIDs and those with hidden SSIDs. In order to determine information of APs with hidden SSIDs, the scan module 450 may be configured to actively scan those APs (as opposed to the passive scan of the other APs).

After the scan, the scan module 450 generates a WLAN measurement report to inform the base station 300 of the scan results. In an embodiment, the report includes signal strength, BSSID, SSID, as well as other broadcast fields, such as AP load (See IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, incorporated herein by reference in its entirety), HESSID, "Roaming Consortium" (See 802.11u-2011—IEEE Standard for Information Technology-Telecommunications and information exchange between systems-Local and Metropolitan networks-specific requirements—Part II: Wireless LAN Medium Access Control (MAC) and Physical Layer (PHY) specifications: Amendment 9: Interworking with External Networks, incorporated herein by reference in its entirety), and any vendor specific fields, the UE should be able to report them as well.

If the received WLAN measurement configuration message included a whitelist (e.g. approved) or blacklist (e.g. disapproved), the scan module 450 generates the WLAN measurement report to only include the information of the APs that satisfy the white/blacklist.

To summarize the above, the scan module 450 generates and transmits the WLAN measurement report to include: (1) signal strength, BSSID, and/or SSID; and (2) (Optionally) BSS load, HESSID, "Roaming Consortium," and any vendor specific fields from the WLAN beacon.

WLAN Measurement Information for Self-Optimization

Self-configuring and self-optimizing network (SON) is a feature that can be used to reduce operational efforts and complexity for mobile wireless networks. In the early deployment phase, the efforts to set up and optimize were significant and traditionally lead to lengthy periods of getting an optimum and stable system setup. One SON scenario configures and instructs each UE to perform measurements on the radio resources in its vicinity and the network can use such information to discover neighbor cells and/or optimize the network configurations. Here, this concept is extended to wireless inter-system networks, e.g. for the network to discover offload WLAN APs in the deployments, by using. WLAN measurement configuration message and WLAN measurement report message and related procedures.

If the network knows the UE is able to provide location information (e.g. through prior UE capability exchanges), the network may optionally request the UEs to append location information by setting a flag in WLAN measurement configuration message. Upon receiving such request, the UE shall append location information, whenever such information is available, for each BSSID discovered when they report measurement results in the WLAN measurement report message.

To summarize, the network optionally adds, in the WLAN measurement configuration message, request location information in measurement reports. Additionally, the UE can optionally provide, in the WLAN measurement report together with the existing contents described above (See e.g., "WLAN Measurement LTE Configuration"), location information where the corresponding BSSID is discovered.

WLAN Handover Command

After the base station 300 receives the WLAN measurement report from the UE 400, the base station 300 forwards the received report to the handover module 360. Based on the information contained in the report, the handover module 360 makes a determination as to whether the UE 400 should offload to a WLAN AP or other base station, and notifies the UE 400 accordingly. The handover module 360 can cause the notification module 330 to issue a WLAN handover command message upon determining that a handover is needed. The WLAN handover command notifies the UE 400 to perform a handover to an AP identified in the command message. The AP can be identified by its BSSID, or by another method, as will be described in further detail below.

In the WLAN handover command, the handover module 360 can optionally include WLAN security parameters and credentials so as to expedite the security procedures to take place between the UE 400 and the WLAN Access point. The handover module 360 can acquire this information via the host 220. When pre-authentication is available, the handover module 360 can also provide pre-authentication WLAN credentials. On the other hand, when pre-authentication is not available, the handover module 360 can optionally provide one or more of the following security parameters relating to the WLAN AP: (1) WLAN security mode: WEP, 802.1X, WPA, WPA-PSK, WPA2, WPA2-PSK; and/or (2) EAP authentication methods: EAP-MD5, EAP-OTP, EAP-GTC, EAP-TLS, EAP-TTLS, EAP-IKEv2, EAP-SIM, EAP-AKA.

In an embodiment, the handover module 360 may determine that a handover is needed without the WLAN measurement configuration and report procedures having been completed or configured. For purposes of this discussion, this procedure will be referred to as a "blind handover." In the blind handover embodiment, the handover module 360 preferably knows the location of the UE and has confidence that the UE 400 can attach to a specific AP with good success. For example, the UE notification message can indicate the UE location determined by an UE on-board location module (e.g. GPS), or other location methods can be used such as the LTE Positioning Protocol. (See e.g. 3GPP TS 36.355 specification, incorporated herein by reference in its entirety). In this case, the handover module 360 causes the notification module 330 to generate the WLAN handover command message with the BSSID of the desired AP, and optionally the security parameters of the WLAN AP.

To summarize the above, upon determining that a handover should be performed, the handover module 360 causes the notification module 330 to generate and transmit a WLAN handover command message to the UE 400 that includes: (1) AP ID; and (2) (Optionally) WLAN security parameters.

WLAN Handover

Once the UE 400 receives the WLAN handover command, the UE 400 attempts to connect to the desired AP identified in the command. In doing so, the UE 400 tunes its radio 414 for WLAN to the frequency of the AP, and attempts to establish a connection with the AP. If the command included security information, the UE 400 can use the security information to expedite authentication between the AP and the UE 400.

In an embodiment, the WLAN handover command can include more than one desired AP for potential offload. In this scenario, the UE 400 can be configured to attempt to establish a connection with each of the APs in the order that they are listed, until a successful connection is established. Whether the command includes one or multiple APs, if the UE 400 has attempted to establish connection with all the listed APs unsuccessfully, then the UE 400 should re-establish connection with the base station 300. This can be performed by following current LTE "re-establishment" procedures and defined in the 3GPP LTE specification, for example.

Message Size Reduction

Optionally, the base station 300 and the UE 400 can be configured to notate listings of APs within any of their respective messages. Therefore, this method can be applied to any of the WLAN measurement configuration, WLAN measurement report, and WLAN handover command messages. As discussed above, one way to identify each of the APs in these messages is to list their SSID or BSSIDs. However, these identifiers are relatively long in length (e.g., a typical SSID can be a 31-octet string). Therefore, rather than identify each of the APs by their full string, each can be assigned a label of only a few bits. The label can then be used to an access a pre-existing table available to both the base station 300 and the UE 400, to identify the actual SSID and BSS ID.

One method that is easily implementable is to label each of the APs by their position in the whitelist supplied in the WLAN measurement configuration message. For example, the first AP would be labeled 1, the second AP would be labeled 2, and so on. The number of bits used to represent the labels can be static based on a maximum number of APs that the base station 300 anticipates finding at any UE location, static based on the maximum number of APs known to the base station 300, or dynamic based on the number of APs that are to be included within the WLAN measurement configuration message. Another method is to label each of the APs by their position in the measurement report supplied in the WLAN measurement report message. Using this implementation, each AP identifier can be reduced from several bits in size to only a few, thereby substantially reducing message sizes, which results in many following benefits.

Exemplary Offloading Message Flows

Although each of the messaging steps has been described above in great detail, the flow of these steps in different configuration scenarios is discussed in greater detail below with respect to FIGS. 5-8. For purposes of discussion, it will be assumed that the offload measuring and decision-making is being done in an LTE network, and that the offloading is being directed to a WLAN access point.

Discussed above were three scenarios that depended on the availability of WLAN interworking notification and UE notification. FIGS. 5-8 illustrate these individual scenarios, as discussed below. In each of FIGS. 5-7, the procedure begins with a few common steps that are described first, and then not repeated for each of FIGS. 5-7. First, the base station 300 (labeled "E-UTRAN") transmits the WLAN Interworking Capability Inquiry message to the UE 400 (510, 610, and 710) so as to request UE device capabilities. In response, the UE 400 transmits the WLAN Interworking Capability Information message (520, 620, and 720) that details the UE's capabilities as they relate to UE notification, WLAN interworking notification, and others. Following the WLAN Interworking Capability Information message, the base station 300 transmits the WLAN Notification Configuration message (530).

WLAN Interworking Notification Allowed—UE Notification Allowed

Figure 5:
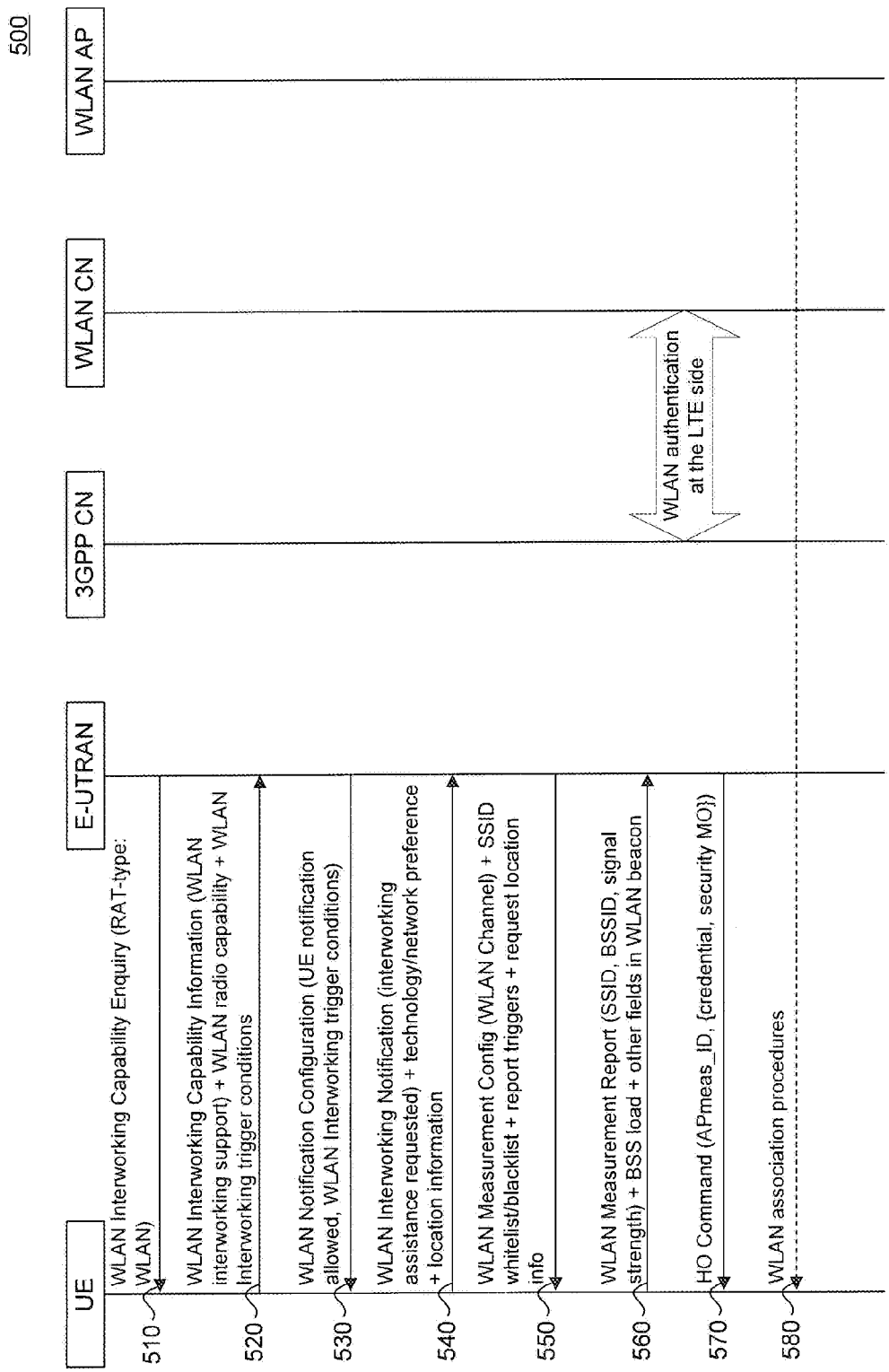
FIG. 5 illustrates a flowchart diagram of an exemplary handover procedure according to an embodiment.

FIG. 5 illustrates a flowchart diagram of a first exemplary handover procedure according to an embodiment in which the base station identifies both WLAN interworking notification and UE notification as being allowed. Therefore, in this scenario, the base station 300 indicates in the WLAN Notification Configuration message that both WLAN interworking notification and UE notification are allowed. Further, the WLAN Notification Configuration message may also identify the triggers that can be used by the UE 400.

The UE 400 receives the WLAN Notification Configuration message and configures its trigger monitoring module 440 to monitor the triggers defined in the message. As part of the WLAN interworking notification, when the trigger monitoring module 440 detects that one of the defined triggers has been met, the trigger monitoring module 440 can cause a WLAN Interworking Notification message (540) to be sent to the base station 300 that includes a notification of the trigger that has been satisfied. Optionally, the WLAN Interworking Notification message can include the location of the UE 400 by prompting the location module 430, and/or its accuracy. The location information can be used by the base station when configuring the scan parameters of the UE 400.

The base station 300 then issues a WLAN measurement configuration message (550) that identifies one or more of WLAN channels to be scanned, an AP white/blacklist indicating which APs to report back to the base station 300, and scan triggers, among others as described above. Upon the trigger being met, or some other condition, the UE 400 performs a scan in accordance with the measurement configurations set forth in the WLAN measurement configuration message. Because UE notification is enabled, the UE 400 then issues a WLAN measurement report message (560) that includes a listing of APs that were scanned, and corresponding information of those APs, such as SSID, BSSID, signal strength, BSS load, or others.

Using the information included within the WLAN measurement report message, the base station 300 performs a handover determination. Upon determining that a handover should be initiated, the base station 300 transmits a handover command (570) that identifies one or more APs to which the UE 400 should attempt to handover. Optionally, the base station 300 can also provide security information of the APs.

After receiving the handover command, the UE 400 proceeds to attempt to establish connection with each of the APs (580) identified in the command, in the order of their listing, until a successful connection is established. If security information was included in the command, the UE 400 can utilize the information for authentication. If the UE 400 has traversed the entire list of APs in the command without a successful connection, the UE 400 then attempts to re-establish with the base station 300.

WLAN Interworking Notification Not Allowed—UE Notification Allowed

Figure 6:
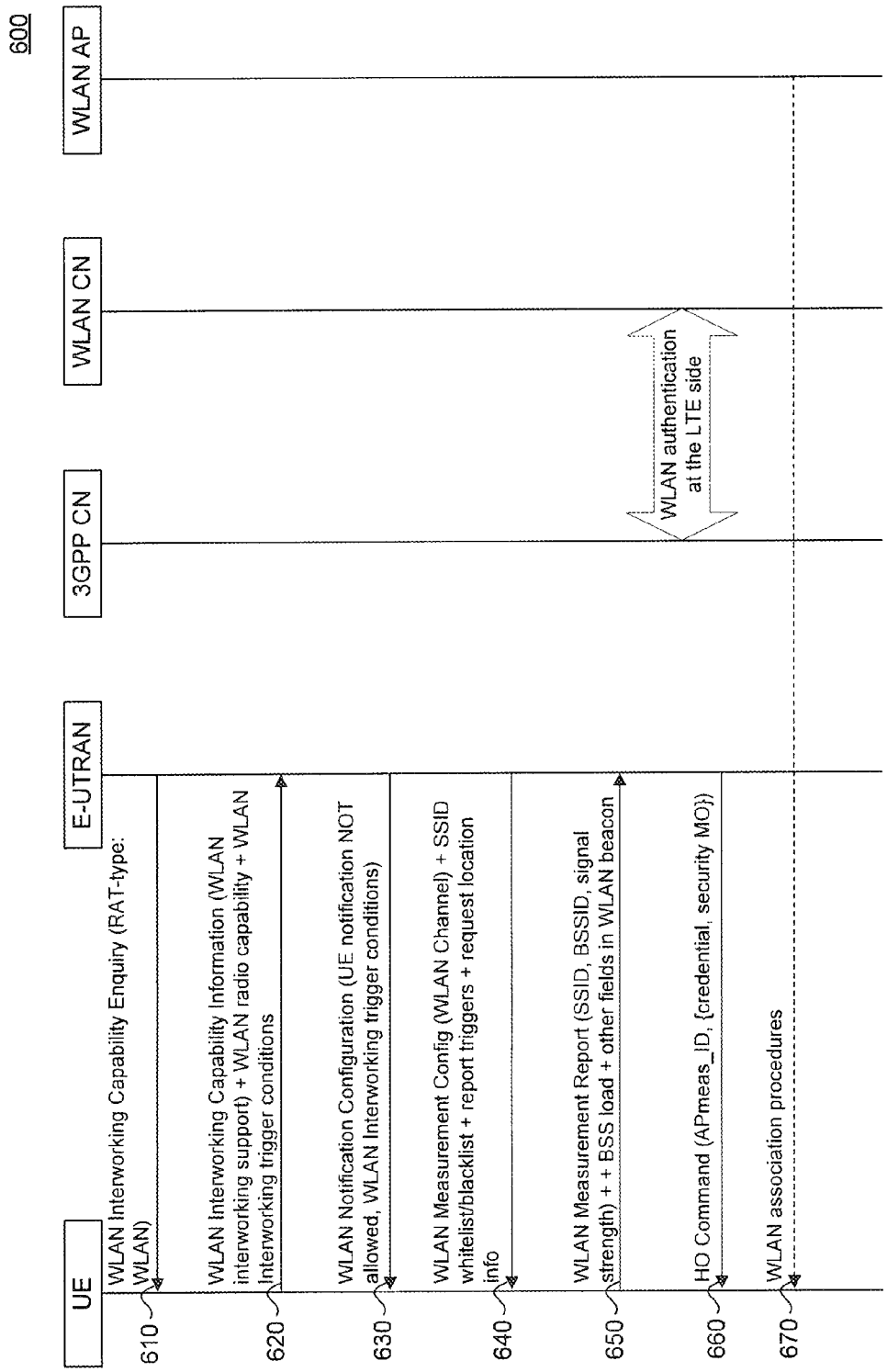
FIG. 6 illustrates a flowchart diagram of an exemplary handover procedure according to an embodiment.

FIG. 6 illustrates a flowchart diagram of a second exemplary handover procedure according to an embodiment in which the base station identifies WLAN interworking notification as being allowed, UE notification as being disallowed.

Therefore, following the WLAN Interworking Capability Information message, the base station 300 transmits the WLAN Notification Configuration message (630) that indicates that the WLAN interworking notification is not allowed, and that the UE notification is allowed. Because WLAN interworking notification is not allowed, the UE 400 does not notify the base station 300 when a trigger has been met. Instead, the base station 300 follows up the WLAN Notification Configuration with the WLAN measurement configuration message (640) identifying one or more of WLAN channels to be scanned, an AP white/blacklist indicating which APs to report back to the base station 300, and scan triggers, among others as described above.

The UE 400 configures itself to scan in accordance with the procedure and/or parameters set forth in the WLAN measurement configuration message (discussed above). Because UE notification is allowed, the UE 400 can scan and report scan results upon the detection of a trigger without additional communication with the base station. Upon performing its scan, the UE 400 issues the WLAN measurement report (650) to notify the base station of the results of the scan.

The base station 300 makes a handover determination based on the information included in the WLAN measurement report and, if it decides a handover is needed, transmits a handover command (660) to the UE 400, which causes the UE to initiate a handover (660).

WLAN Interworking Notification Not Allowed—UE Notification Not Allowed

Figure 7:
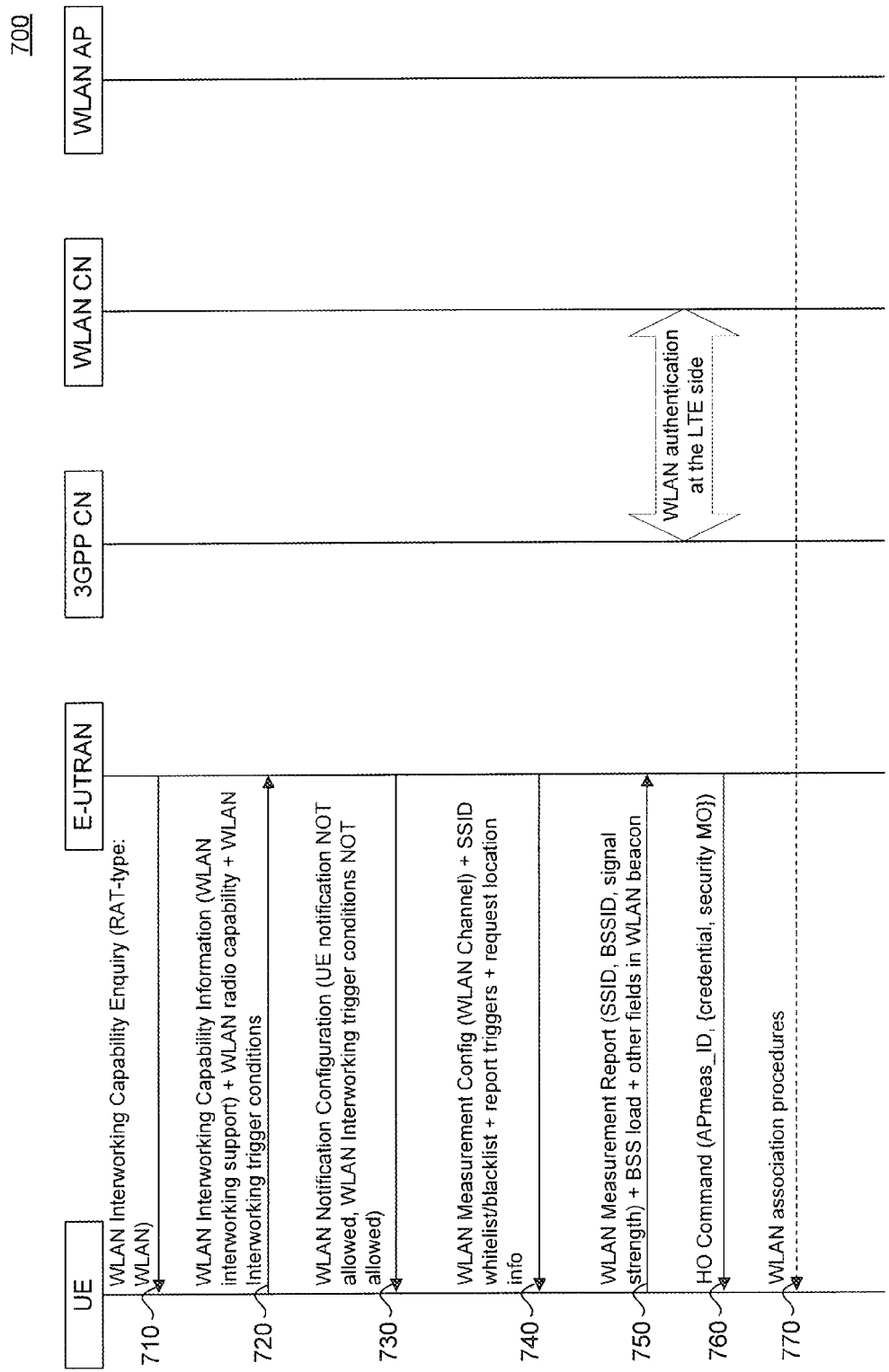
FIG. 7 illustrates a flowchart diagram of an exemplary handover procedure according to an embodiment.

FIG. 7 illustrates a flowchart diagram of a first exemplary handover procedure according to an embodiment in which the base station identifies both WLAN interworking notification and UE notification as not being allowed.

Following the WLAN Interworking Capability Information message, the base station 300 transmits the WLAN Notification Configuration message (730) that indicates that neither WLAN interworking notification or the UE notification is allowed. As with above, because WLAN interworking notification is not allowed, the base station 300 follows up the WLAN Notification Configuration with the WLAN measurement configuration message (740) setting forth the scan parameters. However, because UE notification is also not allowed, the UE 400 only scans after receiving a notification from the base station 300 to do so. In other words, only network based events will trigger a scan. In an embodiment, the receipt of the WLAN measurement configuration message can be the trigger that causes the scan.

After performing its scan according to the WLAN measurement configuration message, the UE 400 replies with the WLAN measurement report (750) that provides the base station 300 with the results of the scan. As with the above, the base station 300 then makes a handover determination based on the information included in the WLAN measurement report and, if it decides a handover is needed, transmits a handover command (760) to the UE 400, which causes the UE to initiate a handover (770).

Blind Handover

Figure 8:
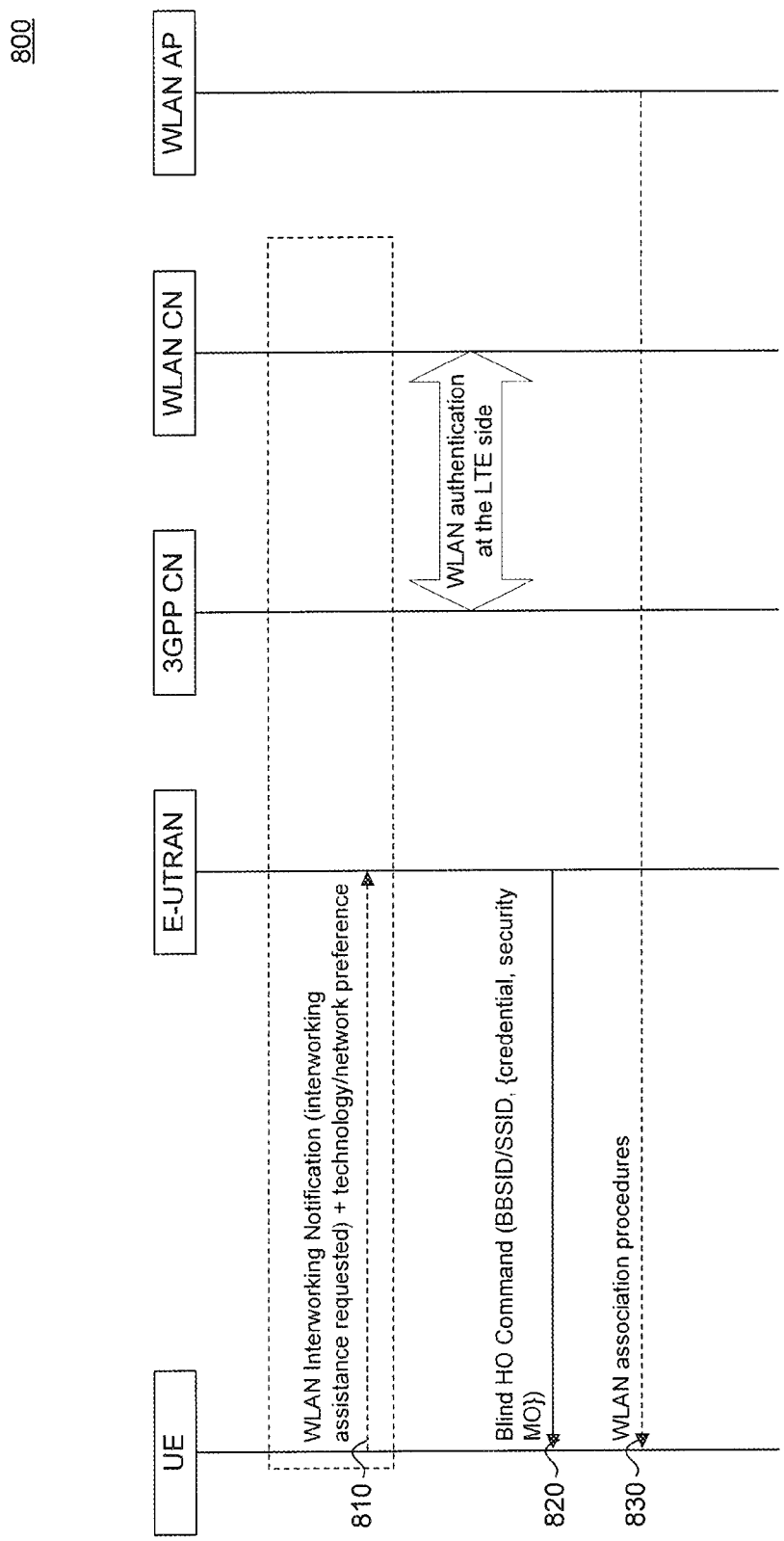
FIG. 8 illustrates a flowchart diagram of an exemplary handover procedure according to an embodiment.

FIG. 8 illustrates a flowchart diagram of a blind handover procedure that may be performed by the base station 300 and the UE 400.

In this scenario, the UE 400 may optionally provide the base station 300 with a WLAN interworking notification message (810), perhaps requesting interworking assistance and notifying the base station 300 of radio access technology (RAT) and network preferences. In any event, the base station 300 independently determines that the UE 400 should handover to a WLAN AP, and thus transmits a handover command (820) to the UE that includes a listing of one or more APs and optionally their security information. The UE 400 then attempts to handover (830) to the APs until a successful connection is established.

The framework described herein supports offloading procedures that can be triggered either autonomously by the network or at the request of the user. In other words, the framework supports both network-based trigger events and user-based trigger events offload scenarios. This enables the broadest coverage of wireless inter-system offload use cases. Additionally, after the base station 300 has made an offload decision, the system utilizes air-interface level enhancements for the cellular network to gather knowledge of radio resources at the offload side. The cellular network can make use of such information to efficiently coordinate inter-system mobility so that the offload latency is reduced, overall system throughput is increased, and the user experience is improved. Also, the proposed framework enables optimizations such as pre-authentication to be done at the cellular side and inter-system "blind handover" to further reduce the offload latency. Further additional benefits may be achieved through the use of the disclosed common framework.

LTE Standard

In order to implement the above configurations, it may be advantageous to revise current standards in order to accommodate these configurations, as described below. For example, it may be advantageous to alter and/or revise the LTE specification, as detailed below.

The message content, the triggers to the message and procedures to be followed upon receiving the messages, as described herein, could be written into a future LTE standard, in order to ease implementation. However, it should be noted that the message content described herein may also be carried by modifying the existing RRC messages, e.g. RRC-ConnectionReconfiguration message, specified in 3GPP TS36.331.

In addition, a WLAN interworking entity in the cellular core network could be added. This entity may be responsible for coordinating network based triggers and providing the most relevant offload network discovery and selection information in the WLAN measurement procedures. The details of this WLAN interworking entity is described in detail in U.S. patent application Ser. No. 14/156,960; filed Jan. 16, 2014, entitled "Wireless Communication System Utilizing Broadcast-Based Blind Offloading," which is incorporated herein by reference in its entirety.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 9:
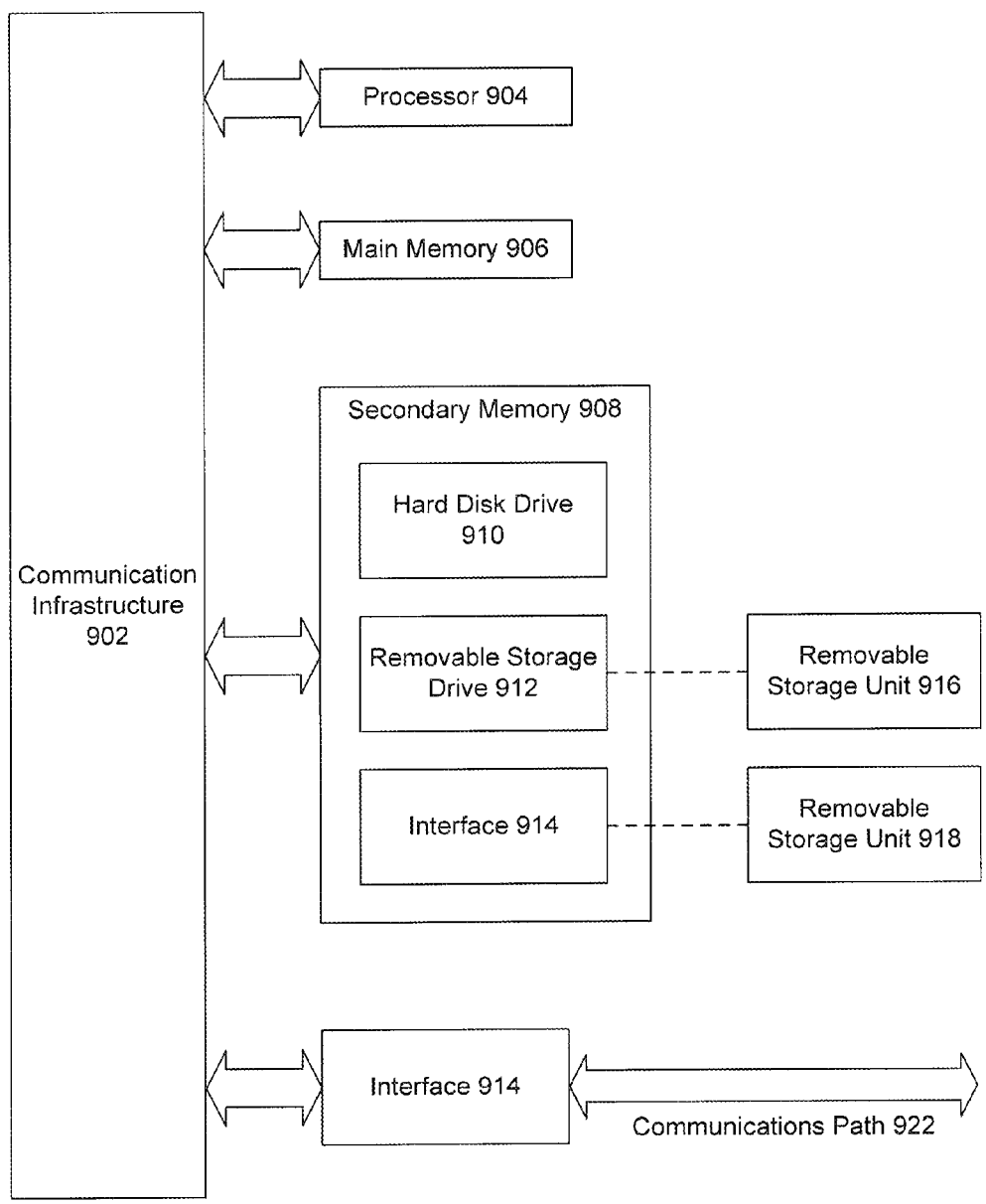
FIG. 9 illustrates a block diagram of a general purpose computer.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. One or more of the modules depicted in the previous figures can be at least partially implemented on one or more distinct computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined in accordance with their recited elements and their equivalents.

What is claimed is:
1. A base station, comprising:
a radio configured to communicate with a user equipment served by the base station; and
a processor and/or one or more circuits, coupled to the radio, configured to:
acquire device capabilities from the user equipment;
transmit notification configuration parameters to the user equipment based on the device capabilities, the notification configuration parameters defining when the user equipment should perform a measurement and report measurement results to the base station; and receive a measurement report from the user equipment providing results of an environment scan performed by the user equipment in accordance with the notification configuration parameters, and determine whether to instruct the user equipment to handover communication to a wireless access point based on the results of the environment scan, the wireless access point using a different radio access technology than the base station.

2. The base station of claim 1, wherein the device capabilities identify whether the user equipment is capable of performing trigger notification in which the user equipment notifies the base station of the occurrence of a first trigger, and wherein the device capabilities include whether the user equipment is capable of performing interworking notification in which the user equipment performs the environment scan and reports the results of the environment scan to the base station upon detecting the occurrence of a second trigger.

3. The base station of claim 1, wherein the processor and/or the one or more circuits is further configured to transmit measurement configuration parameters to the user equipment for configuring the environment scan.

4. The base station of claim 3, wherein the processor and/or the one or more circuits is further configured to transmit the measurement configuration parameters in response to receiving an interworking notification message from the user equipment indicating that a predetermined trigger has been satisfied.

5. The base station of claim 3, further comprising:
a storage device configured to store a listing of at least one known wireless access point, wherein the measurement configuration parameters identify the at least one known wireless access point as a target for scanning during the environment scan.

6. The base station of claim 3, wherein the measurement configuration parameters further include a report trigger that, when satisfied, causes the user equipment to perform the environment scan and report the results of the environment scan to the base station.

7. A base station, comprising:
a radio configured to communicate with a user equipment served by the base station; and
a processor and/or one or more circuits, coupled to the radio, configured to
acquire device capabilities from the user equipment;
define a trigger that will cause the user equipment to take a predetermined action when the trigger is satisfied;
transmit notification configuration parameters to the user equipment based on the device capabilities, wherein the notification configuration parameters include the trigger; and
receive a measurement report from the user equipment providing results of an environment scan performed by the user equipment, and determine whether to instruct the user equipment to handover communication to a wireless access point based on the results of the environment scan, the wireless access point using a different radio access technology than the base station.

8. The base station of claim 7, wherein the trigger corresponds to a proposed trigger that the base station received from the user equipment.

9. A user equipment, comprising:
a first radio configured to communicate with a base station serving the user equipment;
a second radio configured to communicate with one or more wireless access points that use a different radio access technology than the base station; and
a processor and/or one or more circuits, configured to:
transmit a description of device capabilities of the user equipment to the base station using the first radio;
receive notification configuration parameters from the base station, the notification configuration parameters including, a trigger defined by the base station and/or based on the device capabilities;
store the trigger;
monitor one or more parameters to detect satisfaction of the trigger; and
perform an environment scan using the second radio upon the detection of the satisfaction of the trigger, and report results of the environment scan to the base station using the first radio.

10. The user equipment of claim 9, wherein the processor and/or the one or more circuits is further configured to define a proposed trigger for proposing to the base station, the proposed trigger being transmitted together with the description of device capabilities to the base station.

11. The user equipment of claim 9, wherein the processor and/or the one or more circuits is further configured to, when the trigger has been satisfied, transmit an interworking notification message to the base station using the first radio notifying the base station of the satisfied trigger.

12. The user equipment of claim 9, wherein the processor and/or the one or more circuits is further configured to perform the environment scan according to scan parameters received from the base station.

13. The user equipment of claim 12, wherein the scan parameters identify a particular wireless access point of the one or more wireless access points, and the processor and/or the one or more circuits is further configured to scan the particular wireless access point as part of the environment scan.

14. The user equipment of claim 9, wherein the processor and/or the one or more circuits is further configured to receive a handover command from the base station using the first radio, the handover command identifying a selected wireless access point from the one or more wireless access points, and to perform a handover procedure to the selected wireless access point using the second radio.

15. The user equipment of claim 14, wherein the processor and/or the one or more circuits is further configured to use security information of the selected wireless access point provided in the handover command during the handover procedure.

16. A method of performing handover decisions by a base station for a user equipment that is served by the base station, the method comprising:
requesting device capabilities of the user equipment;
receiving the device capabilities from the user equipment;
transmitting notification configuration parameters to the user equipment based on the device capabilities, the notification configuration parameters indicating whether a first notification procedure is to be used and whether a second notification procedure is to be used, the first and second notification procedures each differently defining when the user equipment should perform a measurement and report measurement results to the base station;

receiving results of an environment scan performed by the user equipment in accordance with the first notification procedure or the second notification procedure that was indicated to be used, the results including a listing of detected wireless access points and at least one connection parameter of each of the detected wireless access points;

determining, from the results of the environment scan, whether the user equipment is to perform a handover procedure to one of the detected wireless access points; and transmitting a handover command to the user equipment when it is determined that the user equipment should perform the handover procedure.

17. The method of claim 16, further comprising:

transmitting, when the notification configuration parameters indicate that the first notification procedure is to be used, a first trigger to be used with the first notification procedure; and transmitting, when the notification configuration parameters indicate that the second notification procedure is to be used, a second trigger to be used with the second notification procedure.

18. The method of claim 17, further comprising;

acquiring security information of the one of the detected wireless access points through a network backhaul, wherein the handover command includes the security information.

19. The method of claim 16, further comprising transmitting measurement configuration parameters for configuring the environment scan, the measurement configuration parameters including an approved list of wireless access points, wherein the listing of the detected wireless access points included within the results of the environment scan is limited to wireless access points identified in the approved list.

20. The method of claim 19, wherein the results of the environment scan identify the detected wireless access points by their corresponding numerical positions in the approved list of wireless access points.

* * * * *

UNITED STATES PATENT AND TRADEMARK OFFICE
CERTIFICATE OF CORRECTION

PATENT NO. : 9,462,515 B2  
APPLICATION NO. : 14/157112  
DATED : October 4, 2016  
INVENTOR(S) : Wang et al.

Page 1 of 1

It is certified that error appears in the above-identified patent and that said Letters Patent is hereby corrected as shown below:

In the Claims

In Column 19, Line 51, replace "configured to" with --configured to:--.

In Column 22, Line 5, replace "further comprising;" with --further comprising:--.

Signed and Sealed this  
Twenty-seventh Day of March, 2018

Andrei Iancu  
*Director of the United States Patent and Trademark Office*